US008862873B2

(12) United States Patent
Asahara

(10) Patent No.: US 8,862,873 B2
(45) Date of Patent: Oct. 14, 2014

(54) SHORTCUT MANAGEMENT UNIT AND METHOD, AND STORAGE MEDIUM

(75) Inventor: Hideo Asahara, Yokohama (JP)

(73) Assignee: Canon Kabushiki Kaisha (JP)

(*) Notice: Subject to any disclaimer, the term of this patent is extended or adjusted under 35 U.S.C. 154(b) by 451 days.

(21) Appl. No.: 12/707,497

(22) Filed: Feb. 17, 2010

(65) Prior Publication Data
US 2010/0212023 A1    Aug. 19, 2010

(30) Foreign Application Priority Data

Feb. 18, 2009    (JP) .................................. 2009-035401

(51) Int. Cl.
G06F 21/00    (2013.01)
G06F 21/10    (2013.01)

(52) U.S. Cl.
CPC ..................................... G06F 21/10 (2013.01)
USPC ........................................... 713/156; 713/158

(58) Field of Classification Search
USPC ..................................... 713/158, 156; 726/27
See application file for complete search history.

(56) References Cited

U.S. PATENT DOCUMENTS

| 2002/0122076 | A1 | 9/2002 | Nakaki | |
| 2006/0245564 | A1* | 11/2006 | Li et al. | 379/114.02 |
| 2007/0028231 | A1* | 2/2007 | Kelso et al. | 717/174 |
| 2009/0183124 | A1* | 7/2009 | Sridhar et al. | 715/847 |
| 2009/0199109 | A1* | 8/2009 | Doui | 715/750 |
| 2009/0292735 | A1* | 11/2009 | Sahasrabudhe | 707/200 |
| 2010/0050128 | A1* | 2/2010 | Chiang et al. | 715/847 |
| 2012/0041878 | A1* | 2/2012 | Yim | 705/44 |

FOREIGN PATENT DOCUMENTS

| JP | 2002-259010 A | 9/2002 |
| JP | 2002-297255 A | 10/2002 |
| JP | 2007-069368 A | 3/2007 |
| JP | 2008-085477 A | 4/2008 |
| JP | 2008-299856 A | 12/2008 |

OTHER PUBLICATIONS

Japanese Office Action issued in Japanese counterpart application No. JP2009-035401, dated Nov. 20, 2012.
Japanese Office Action for corresponding JP 2013-113399, mail date Feb. 18, 2014.

* cited by examiner

Primary Examiner — Edward Zee
Assistant Examiner — Chi Nguy
(74) Attorney, Agent, or Firm — Rossi, Kimms & McDowell LLP

(57) ABSTRACT

A shortcut management device capable of improving user-friendliness of a portal application. The shortcut management device is capable of executing shortcuts which use functions of an electronic apparatus, and manages at least part of the functions used by the shortcuts. A storage unit registers shortcuts. An invalidation detecting unit detects that the license is invalidated. A retrieval unit retrieves a shortcut made inexecutable in association with the license of which the invalidation is detected. An invalidation unit invalidates the retrieved shortcut.

9 Claims, 13 Drawing Sheets

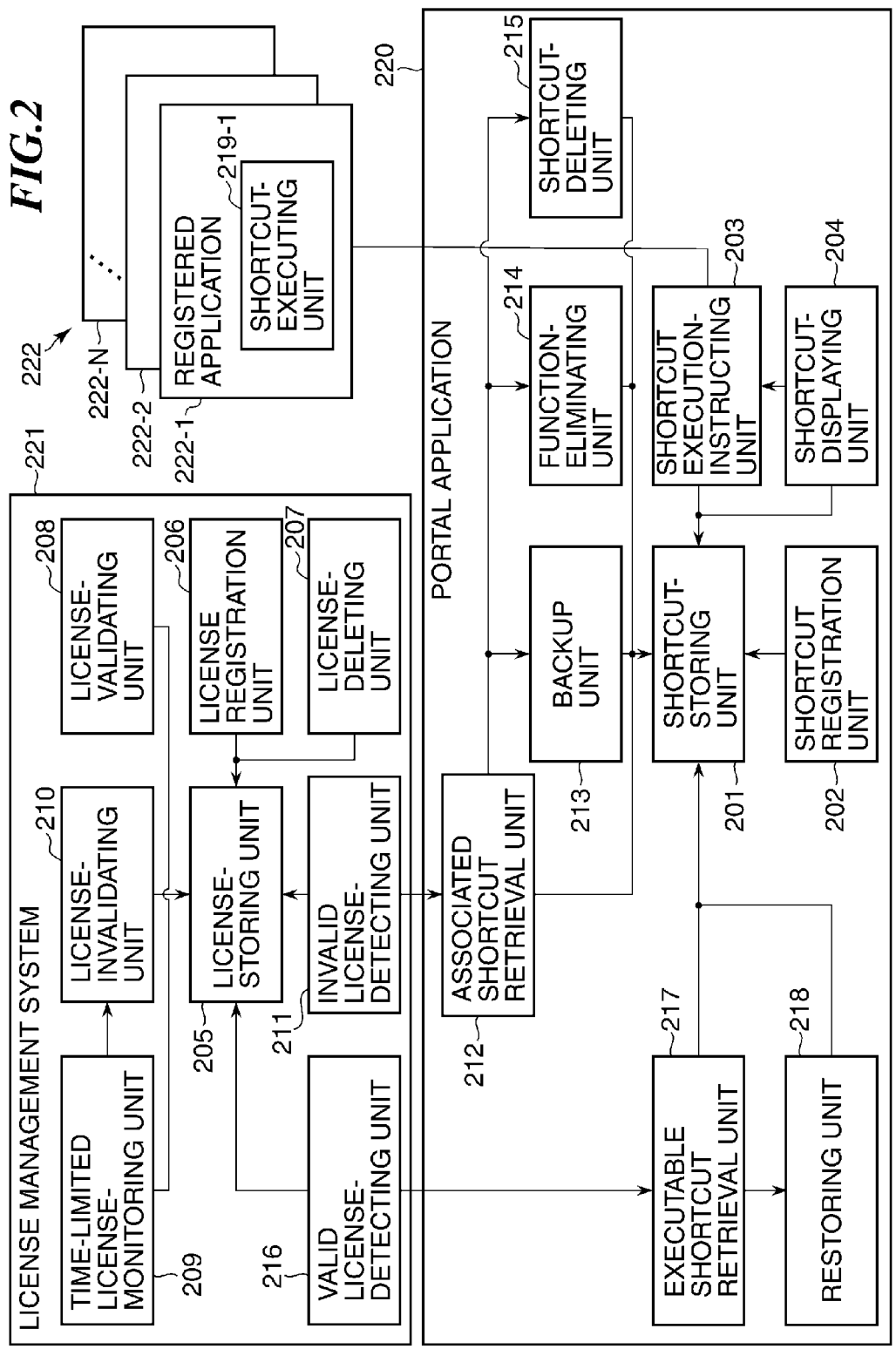

```xml
<?xml version ="1.0"encoding= "UTF-8"?>
<CustomMenuData>
 <Header>
   <Version>1.0.0</Version>
   <Data>2007.12.11</Data>
   <Time>14:00</Time>
   <Locale>ja</Locale>
 </Header>
 <ApplicationData>
   <Application>
     <AppName>PORTAL APPLICATION </AppName>
     <AppID>11111111-1111-1111-111111111111</AppID>
     <User>
       <UserAttribute>USER ID</UserAttribute>
       <Domain> DOMAIN NAME</Domain>
     </User>
     <Button>
       <ActID>22222222-2222-2222-222222222222</ActID>
       <Data>
         <AppID>33333333-3333-3333-333333333333</AppID>
         <Alias>REGISTERED APPLICATION</Alias>
         <Index>1</Index>
         <Name>BUTTON NAME</Name>
         <Comment>COMMENT TEXT</Comment>
       </Data>
     </Button>
   </Application>
 </ApplicationData>
</CustomeMenuData>
```

```
<?xml Version ="1.0"encoding= "UTF-8"?>
<name>SHORTCUT1</name>
<wolkflow ActID=22222222-2222-2222-2222-222222222222>
  <work>
    <APPLICATION>scan</APPLICATION>
    <OPERATION SETTING>
      <DOUBLE-SIDED SCAN>on</DOUBLE-SIDED SCAN>
    </OPERATION SETTING>
  </work>
  <work>
    <APPLICATION>send</APPLICATION>
    <OPERATION SETTING>
      <DESTINATION>a@b.com</DESTINATION>
      <HIGH COMPRESSION PDF>on</HIGH COMPRESSION PDF>
      <ENCRYPTED PDF>on</ENCRYPTED PDF>
    </OPERATION SETTING>
  </work>
</wolkflow>
```

FIG.5

401
402 — LICENSE ID : 01234567-89ab-cdef-0123-456789abcdef
403 — LICENSED FUNCTION ID : 01234567-89ab-cdef-0123-456789abcdee
404 — LICENSED DEVICE ID : 01234567-89ab-cdef-0123-456789abcded

FIG.6

501
502 — LICENSE ID : 01234567-89ab-cdef-0123-456789abcde0
503 — LICENSED FUNCTION ID : 01234567-89ab-cdef-0123-456789abcde1
504 — LICENSED DEVICE ID : 01234567-89ab-cdef-0123-456789abcde2
505 — LICENSE RANGE : DATE(2008/07/01,2008/12/31)&COUNT(EXE1000)
                            506                              507

FIG.7

```xml
                601
<?xml version ="1.0"encoding= "UTF-8"?>
<name>SHORTCUT1</name>
<wolkflow>
        <work>
                <APPLICATION>scan</APPLICATION>
                <OPERATION SETTING>
                        <DOUBLE-SIDED SCAN>on</DOUBLE-SIDED SCAN>
                </OPERATION SETTING>
        </work>
        <work>
                <APPLICATION>send</APPLICATION>
                <OPERATION SETTING>
                        <DESTINATION>a@b.com</DESTINATION>
                        <ENCRYPTED PDF>on</ENCRYPTED PDF>
                </OPERATION SETTING>
        </work>
</wolkflow>
```

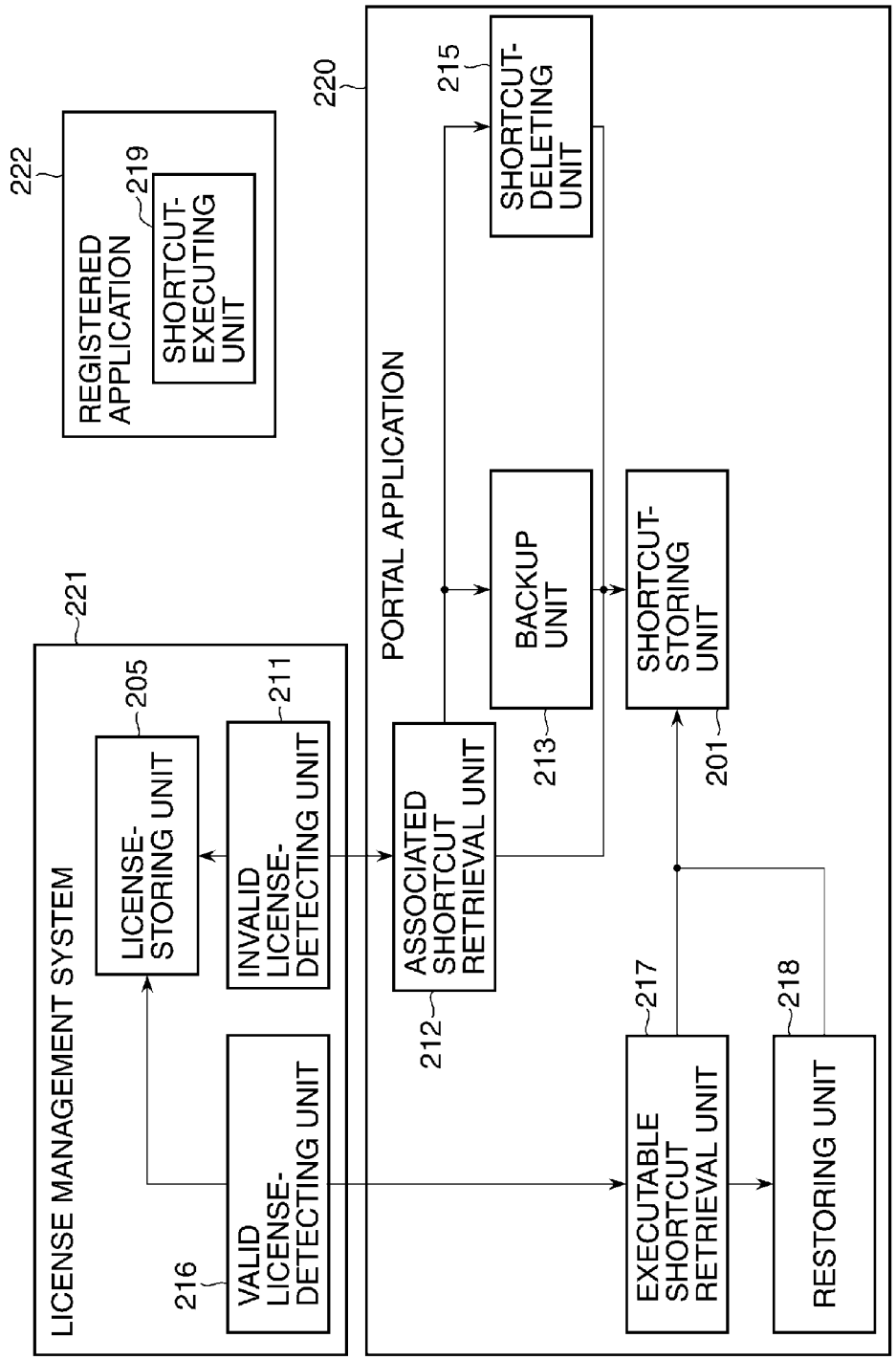

SHORTCUT MANAGEMENT UNIT AND METHOD, AND STORAGE MEDIUM

BACKGROUND OF THE INVENTION

1. Field of the Invention

The present invention relates to a shortcut management device which is capable of executing a shortcut using a function of an electronic apparatus, and managing at least part of the function used through the shortcut, according to the license, and a shortcut management method.

2. Description of the Related Art

Recently, embedded devices have also been provided with an environment which dynamically starts and stops an unspecified application to cause the same to operate therein. Under such a circumstance, an application has been developed which manages a shortcut for calling the function of the unspecified application with particular settings. Here, the application for managing shortcuts is referred to as a portal application.

In general, this application has a function of displaying a list of managed shortcuts on an operation screen. The application operates such that a user selects a desired shortcut and instructs the same to be executed, whereby another application is executed by a specific setting associated with the shortcut. Here, the application actually called in association with the shortcut is referred to as a registered application.

The shortcuts are required to be continuously managed. For example, there are cases where an application which is no longer required is deleted, and a newly required shortcut is created. To save the effort of managing these shortcuts, there has been proposed a portal application which is configured to automatically perform creation and deletion of shortcuts (see Japanese Patent Laid-Open Publication No. 2002-259010).

Japanese Patent Laid-Open Publication No. 2002-259010 discloses a configuration in which if conditions predetermined by a registered application for shortcut creation are satisfied, a shortcut associated therewith is automatically created, and if conditions predetermined by the same for shortcut deletion are satisfied, the shortcut is automatically deleted. As a specific example of the conditions for shortcut creation, the publication describes the number of times of starting of the registered application. Further, as a specific example of the conditions for shortcut deletion, the publication describes a time period during which the registered application is not started, and a ratio of the number of times of starting per a predetermined time period. If the configuration described in Japanese Patent Laid-Open Publication No. 2002-259010 is employed, it becomes unnecessary for a user to perform creation and deletion of shortcuts, and hence it can expected to achieve advantageous effects of reduction of the management costs.

On the other hand, some registered applications provided in an embedded device require licenses for respective operations of the applications themselves, or part of the functions of the applications. The license of each application includes a type which permits the use of the application for a predetermined time period, or a type which permits the use of the same until it is executed a predetermined number of times. In such a license, if a condition is not satisfied any longer, the license is invalidated, which makes unavailable the application or part of the functions thereof associated with the license.

However, the above-mentioned shortcut management device suffers from the following problem: In the shortcut management device disclosed in Japanese Patent Laid-Open Publication No. 2002-259010, a first problem is that even if the license is invalidated, making unavailable the associated application or part of the functions of the application, the shortcut remains for a while. This causes a problem that the portal application is not user-friendly during the time.

A second problem is that since no consideration is given to a case of creation of a shortcut by integrating settings for processing by a registered application, it is difficult to automatically create the shortcut in which the settings are integrated. Therefore, it is required to reconfigure the settings for processing by the registered application associated with the shortcut after the application is started via the shortcut. This makes the portal application not user-friendly.

A third problem is that since no consideration is given to a case of creation of a shortcut by integrating settings for processing by a registered application, similarly to the second problem, even if part of the functions used by the registered application becomes unavailable, the proposed shortcut management device does not perform maintenance on the shortcut. Therefore, the user has to take the trouble to manually edit or delete the shortcut. Further, the proposed shortcut management device cannot cope with a case where the user desires to make use of the shortcut after eliminating part of the functions used by the registered application.

SUMMARY OF THE INVENTION

The present invention provides a shortcut management device, a shortcut management method, and a storage medium, which are capable of improving user-friendliness of a portal application.

In a first aspect of the present invention, there is provided a shortcut management device which is capable of executing shortcuts which use functions of an electronic apparatus, and manages at least part of the functions used by the shortcuts according to a license, comprising a storage unit in which the shortcuts are registered, an invalidation detecting unit configured to detect that the license is invalidated, a retrieval unit configured to retrieve a shortcut which is made inexecutable in association with the license of which the invalidation is detected by the invalidation detecting unit, and an invalidation unit configured to invalidate the shortcut which is retrieved by the retrieval unit.

In a second aspect of the present invention, there is provided a shortcut management method for an electronic apparatus which is capable of executing shortcuts which uses functions of the electronic apparatus, and manages at least part of the functions used by the shortcuts according to a license, comprising causing the electronic apparatus to detect that the license is invalidated, causing the electronic apparatus to retrieve a shortcut which is made inexecutable in association with the license of which the invalidation is detected by the detecting, and causing the electronic apparatus to invalidate the shortcut which is retrieved by the retrieving.

In a third aspect of the present invention, there is provided a computer-readable storage medium storing a program for causing a computer to execute a shortcut management method for an electronic apparatus which is capable of executing shortcuts which use functions of the electronic apparatus, and manages at least part of the functions used by the shortcuts according to a license, wherein the method comprises causing the electronic apparatus to detect that the license is invalidated, causing the electronic apparatus to retrieve a shortcut which is made inexecutable in association with the license of which the invalidation is detected by the detecting, and causing the electronic apparatus to invalidate the shortcut which is retrieved by the retrieving.

When a license is invalidated to make functions of the associated electronic apparatus unavailable, the shortcut management device according to the first aspect of the present invention immediately and automatically invalidates the shortcut. This improves the user-friendliness of the portal application. Further, according to the shortcut management method according to the second aspect of the present invention, it is also possible to obtain the same advantageous effects as provided by the first aspect of the present invention.

Further features of the present invention will become apparent from the following description of exemplary embodiments with reference to the attached drawings.

BRIEF DESCRIPTION OF THE DRAWINGS

FIG. 2 is a block diagram of various software units stored in a recording medium, such as an auxiliary storage device, in a controller section.

FIG. 3 is a diagram showing a description of a shortcut file.

FIG. 4 is a diagram showing a shortcut definition file describing details of processes to be executed by a shortcut.

FIG. 5 is a diagram showing a specific example of a permanent license.

FIG. 6 is a diagram showing a specific example of a time-limited license.

FIG. 7 is a diagram showing a description of a shortcut acquired as a result of eliminating the setting of high-compression PDF.

FIG. 14 is a block diagram of the minimum required various software units.

DETAILED DESCRIPTION OF THE EMBODIMENTS

The present invention will now be described in detail below with reference to the accompanying drawings showing embodiments thereof.

A description will be given of a shortcut management device according to an embodiment of the present invention with reference to the drawings. The shortcut management device according to the present embodiment is applied to an image forming apparatus.

Figure 1:
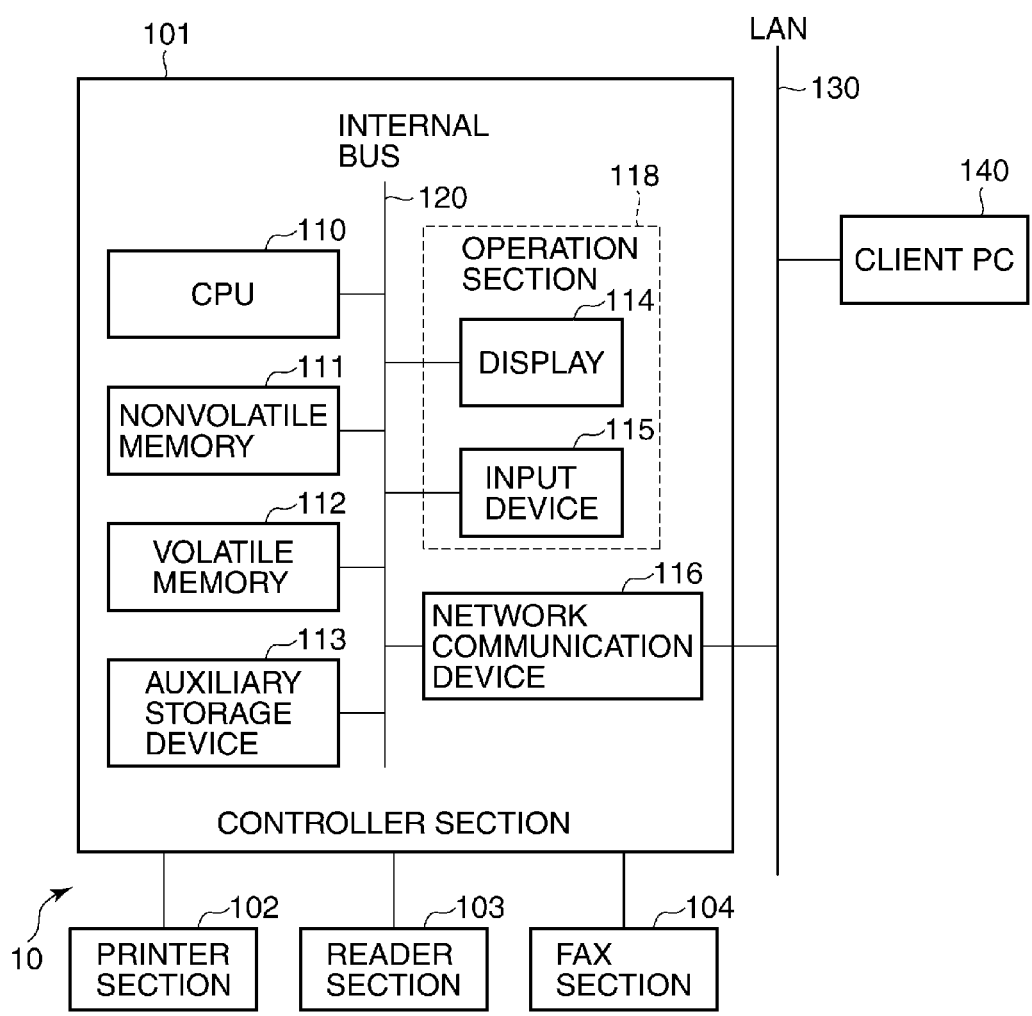
FIG. 1 is a schematic block diagram of an image forming apparatus to which a shortcut management device according to an embodiment of the present invention is applied.

FIG. 1 is a schematic block diagram of an image forming apparatus to which the shortcut management device according to the embodiment is applied. The image forming apparatus 10 is comprised of a controller section 101, a printer section 102, a reader section 103, and a facsimile (FAX) section 104.

The printer section 102 is configured to form an image on a sheet using image data. The reader section 103 is configured to read an original to create image data. The facsimile (FAX) section 104 is configured to transmit the read image data to a party on the other end over a telephone line.

The controller section (information processing apparatus) 101 controls the entire apparatus, and is connected to a client PC 140 via a LAN 130. Further, a CPU 110, a nonvolatile memory 111, a volatile memory 112, an auxiliary storage device 113, a display 114, an input device 115, and a network communication device 116 are connected to the controller section 101 via an internal bus 120.

The CPU 110 is configured to execute programs to perform various processes. The nonvolatile memory 111 forms a ROM. The nonvolatile memory 111 stores programs and data required for an initial stage of a process for starting the image forming apparatus 10. The volatile memory 112 forms a RAM, and is used as a temporary storage area for programs and data.

The auxiliary storage device 113 is implemented by a mass-storage device, such as a hard disc, a RAM drive or the like, and stores large volumes of data and execution codes of the programs. Further, the auxiliary storage device 113 stores data required to be held for longer time periods than data to be stored in the volatile memory 112, and hence stores various software units and shortcuts in the present embodiment.

The display 114 is used for notifying information to a user using the image forming apparatus 10. In the present embodiment, it is assumed that the term "user" is always intended to mean the user of the image forming apparatus 10. The input device 115 is used for receiving a selection or an instruction by the user, and transmitting the same to an associated program via the internal bus 120. The network communication device 116 is used for communicating with the other information processing apparatuses via a network. It should be noted that the display 114 and the input device 115 form an operation section 118 of the image forming apparatus 10.

As described above, the internal bus 120 is a communication bus that communicably connects the CPU 110, the nonvolatile memory 111, the volatile memory 112, the auxiliary storage device 113, the display 114, the input device 115, and the network communication device 116, to each other, within the controller section 101.

The LAN 130 is a network which communicably connects the image forming apparatus 10 and the other information processing apparatuses. The client PC 140 is one of the other information processing apparatuses capable of communicating with the image forming apparatus 10 via the LAN 130.

The configurations of the printer section 102, the reader section 103, and the facsimile (FAX) section 104 are known, and further are not directly related to the present invention, and hence detailed descriptions thereof are omitted.

FIG. 2 is a schematic block diagram of various software units stored in a recording medium, such as the auxiliary storage device 113, in the controller section 101. As mentioned above, the sections implemented as the various software units are stored in any of the storage media, such as the nonvolatile memory 111, the volatile memory 112, and the auxiliary storage device 113, and are executed by the CPU 110. In the present embodiment, the various software units are broadly categorized into three: a portal application 220, registered applications 222 (222-1, ..., 222-N), and a license management system 221.

A shortcut-storing unit 201 of the portal application 220 stores shortcuts held by the controller section 101. The shortcuts are stored in the auxiliary storage device 113 as files. FIG. 3 is a diagram showing a description of a shortcut file 301. The shortcut files 301 are created by the portal application 220 so as to manage shortcuts. The shortcut managed by the shortcut file 301 is represented by a button tag in FIG. 3.

Further, details of description of processes of each shortcut are managed in another file (shortcut definition file). FIG. 4 is a diagram showing a shortcut definition file describing details of processes to be executed by a shortcut. The description of the shortcut file 301 shown in FIG. 3A includes an ActID tag as link information. The shortcut definition file indicative of the details of processes to be executed by the shortcut is uniquely identified by means of an ID set in this tag. That is, the ActID is used as information for uniquely identifying the shortcut.

In the description of the shortcut file 301, an application which is executed by the shortcut is indicated by an AppID tag. The application which is actually executed by the shortcut is uniquely identified by means of an ID set in this tag.

Further, an Alias tag indicates an application name. Further, a Name tag indicates the name of the shortcut. Further, a Comment tag indicates a comment given to the shortcut.

As shown in the shortcut file 301, the portal application manages each shortcut by means of two IDs: AppID and ActID. That is, the portal application manages each shortcut such that an application to be executed by the shortcut is uniquely identified by AppID, and the shortcut to be executed is uniquely identified by ActID.

The description of the shortcut definition file (hereinafter simply referred to as the shortcut) 302 illustrated in FIG. 4 indicates details of processes to be executed by a registered application, which are defined on a shortcut basis. The illustrated example shows a case where a shortcut named as Shortcut 1 is formed in a file in XML format.

A Workflow tag includes an attribute ActID. This ActID is associated with the ActID mentioned in the foregoing description of the shortcut file 301, and is for uniquely identifying the shortcut. The illustrated example of the shortcut 302 defines a procedure of execution of double-sided scanning on an original thereby converting the same to high-compressed and encrypted PDF data, and transmitting the data to an address "a@b.com".

A shortcut registration unit 202 appearing in FIG. 2 registers a shortcut created by the controller section 101 in FIG. 1, by the shortcut-storing unit 201 appearing in FIG. 2. If a shortcut is newly registered, a shortcut file 301 in FIG. 3 and a shortcut (shortcut definition file) 302 in FIG. 4 are stored by the shortcut-storing unit 201 for the registered shortcut.

In FIG. 2, a shortcut execution-instructing unit 203 for starting processing by a registered application according to the information of the shortcut. Since the actual processing is performed by the registered application, the shortcut execution-instructing unit 203 triggers execution of the registered application, and passing the setting information required for the processing to the registered application.

A shortcut-displaying unit 204 displays a list of shortcuts stored by the shortcut-storing unit 201 and detailed information on each shortcut. By displaying the list and information on the display 114, it is possible for the user to confirm the shortcuts, and perform an operation on each shortcut using the shortcut execution-instructing unit 203 or the shortcut registration unit 202.

A license-storing unit 205 stores licenses associated with applications and partial functions of applications, which operate in the controller section 101, and statuses of the licenses.

Now, a detailed description will be given of a license. The license is information for enabling the user of the image forming apparatus 10 to use at least one application or a partial function of an application. Further, the license is used for enabling the user to use a function equipped in the image forming apparatus 10. If a license is obtained i.e. validated, at least one associated application or partial function thereof becomes available to the user. Inversely, if the license is invalidated, the at least one associated application or partial function thereof becomes unavailable to the user. When a license is in a validated state, it will be expressed as "the license is valid", whereas when a license is in an invalidated state, it will be expressed as "the license is invalid". Further, each of these statuses are referred to as a license status. In the present embodiment, it is assumed that an application which becomes executable by obtaining the license is a registered application 222. It should be noted that there are a plurality of registered applications 222 (222-1, ..., 222-N), and there are also a plurality of shortcut-executing units 219 (219-1, ..., 219-N) in association with the respective registered applications. The registered applications in the present embodiment include "copy", "print", "scan", and "Send" applications, which correspond to the functions of the image forming apparatus 10, respectively. It is assumed that at least one of the applications is managed under license. Further, a specified function contained in one application may be managed under license. It should be noted that a description will be given of one registered application and one shortcut-executing unit, using the respective reference numerals 222 and 219 in the following description. The information on the license is stored in the auxiliary storage section 113 in a text file. However, when a license is actually obtained, it is in an encrypted form so as to preventing an illegal use of the license, and the license is multiply-backed up. In the present embodiment, a description will be given of a configuration in which the license is managed by only one file in an unencrypted state, by way of example.

Further, the license includes two types: a permanent license and a time-limited license (or limited license). If a permanent license is once obtained i.e. validated, the associated application(s) or the partial function thereof are made available on a permanent basis. FIG. 5 is a diagram showing a specific example of the permanent license.

A permanent license 401 has three items of information: "LICENSE ID" 402, "LICENSED FUNCTION ID" 403, and "LICENSED DEVICE ID" 404. The "LICENSE ID" 402 is an identifier for uniquely identifying this license. The "LICENSED FUNCTION ID" 403 is an identifier for identifying at least one application or partial function of the same, associated with this file of the license. In FIG. 5, the "LICENSED FUNCTION ID" 403 is realized by a UUID (Universal Unique Identifier) identifier. It should be noted that in the present embodiment, the "LICENSED FUNCTION ID" 403 corresponds to the AppID in FIGS. 3 and 4. Further, the "LICENSED DEVICE ID" 404 is an identifier for identifying the image forming apparatus 10 associated with this license file. In FIG. 5, the "LICENSED DEVICE ID" 404 is realized by a UUID identifier.

On the other hand, in the time-limited license, a range in which the license is valid is set. Therefore, even if the license is once validated, the associated application(s) or the partial function thereof is/are not made available on a permanent basis. If the range defined in the license is exceeded, the license is automatically invalidated. After the license is automatically invalidated, the associated application(s) or the partial function thereof become(s) unavailable. The range which can be set to the time-limited license and within which the license is valid includes the following two types: A first type is defined by information indicative of a time period or the number of days during which the associated application(s) or partial function thereof is/are available. A second type is defined by the number of times of execution, which is to be counted by a counter. The number of times of execution is the number of times of starting an application associated with the license or the number of times of using the partial function of the application. Further, it is assumed that instead of the number of times of execution, the number of times of operation of the printer section 102, the reader section 103, or the facsimile section 104 of the image forming apparatus 10 by the execution of the application may be counted.

FIG. 6 is a diagram showing a specific example of the time-limited license. A time-limited license 501 has the following items of information: "LICENSE ID" 502, "LICENSED FUNCTION ID" 503, "LICENSED DEVICE ID" 504, and "LICENSE RANGE" 505.

The "LICENSE ID" 502, the "LICENSED FUNCTION ID" 503, and the "LICENSED DEVICE ID" 504 respectively indicate the same items of information as those in FIG. 5, and hence description thereof is omitted. The "LICENSE RANGE" 505 indicates a range within which the license is valid. A "DATE" 506 indicates a time period during which the license is valid. In the illustrated example in FIG. 6, the license is valid only during the time period between "2008/07/01" and "2008/12/31".

A "COUNT" 507 indicates the number of times of execution of the application(s) or the partial function thereof associated with the license. In the illustrated example in FIG. 6, the license is valid until the application or the partial function, identified by the "LICENSED FUNCTION ID" 503, is used 1000 times. Further, in the illustrated example in FIG. 6, these conditions are combined by a logical operator. More specifically, the "DATE" 506 and the "COUNT" 507 are combined by a logical operator "&". This indicates that the license is valid only during a time period in which both of the conditions of the DATE" 506 and the "COUNT" 507 are satisfied.

A license registration unit 206 registers a license associated with at least one application or partial function of the same which operate in the controller section 101 of the image forming apparatus 10. The registration of the license is performed from the client PC 140 connected via the LAN 130.

A license-deleting unit 207 deletes a license stored by the license-storing unit 205. The deleted license cannot be used in the image forming apparatus 10 before the license is registered again by the license registration unit 206.

A license-validating unit 208 validates an invalidated one of licenses stored by the license-storing unit 205. As mentioned above, if the license is validated, at least one associated application or partial function of an application becomes available to the user.

A time-limited license-monitoring unit 209 monitors whether or not there is a time-limited license of which the range set thereto is exceeded. A specific monitoring method is different depending on the type of range set to the time-limited license. In the present embodiment, a description will be given assuming that a time period during which a license is valid and the number of time of execution of at least one application or partial function of the same with which the license is associated are monitored in accordance with the illustrated example in FIG. 6.

Monitoring the time period during which the license is valid is performed by comparing the current date and time held by the controller section 101 of the image forming apparatus 10 with the information defined in the license. In the illustrated example in FIG. 6, information of a time period between "2008/07/01" and "2008/12/31" is stored, and the time-limited license-monitoring unit 209 continues to monitor whether or not the current date and time is within the time period.

Further, monitoring the number of times of execution of at least one application or partial function of the same with which the license is associated is performed by comparing the counter value of the number of times of execution with information defined in the license. In the illustrated example in FIG. 6, information of the number of 1000 times is stored, and the time-limited license-monitoring unit 209 continues to monitor whether or not the number of times of execution exceeds 1000 times. It should be noted that a detailed flow of processing executed by the time-limited license-monitoring unit 209 will be described hereinafter with reference to FIG. 9.

A license-invalidating unit 210 invalidates a specific license in the validated status out of the licenses stored by the license-storing unit 205. As described above, if a license is invalidated, at least one associated application or partial function of the same becomes unavailable to the user.

An invalid license-detecting unit 211 (invalidation-detecting unit) detects that a license is invalidated by the license-invalidating unit 210. Specifically, the invalid license-detecting unit 211 checks and detects statuses of all licenses stored by the license-storing unit 205. The invalid license-detecting unit 211 holds the statuses of all licenses, and detects an invalidated license by determining the difference between those statuses.

An associated shortcut retrieval unit 212 (searching unit) retrieves a shortcut associated with an invalidated license. The invalidated license is a license detected by the invalid license-detecting unit 211. Here, a phrase "associated with an invalidated license" is intended to refer to a state of a shortcut in which a license associated therewith is invalidated and the shortcut becomes unable to be executed or has come to produce a different result of execution thereof. Therefore, retrieved shortcuts are classified into two types: a type made inexecutable due to invalidation thereof, and a type having come to produce a different result due to the same. Retrieval is performed on the shortcuts stored by the shortcut-storing unit 201.

For example, if the license of "Send" is invalidated, the shortcut 302 (see FIG. 4) is detected as an associated shortcut. Further, the shortcut 302 is classified as the type made inexecutable due to invalidation of the license. Further, if the license of the high-compression PDF is invalidated, the shortcut 302 is detected as an associated shortcut. Further, the shortcut 302 is classified as the type having come to produce a different result due to invalidation of the license. On the other hand, if the license of a searchable PDF is invalidated, the shortcut 302 is not detected as an associated shortcut.

A backup unit 213 stores a shortcut retrieved by the associated shortcut retrieval unit 212 in a manner distinguishable from shortcuts usually used. The retrieved shortcut is stored in a different area partitioned in the auxiliary storage device 113.

A function-eliminating unit 214 is eliminates a function which becomes unavailable from the shortcut. Here, a phrase "a function which becomes unavailable" is intended to mean a function associated with the license detected by the invalid license-detecting unit 211. Further, "eliminate" is intended to mean that only the function associated with the invalidated license is eliminated by changing details of definition of the shortcut.

Further, the function-eliminating unit 214 performs processing on the shortcut which is classified as the type having come to produce a different result due to invalidation of the license out of shortcuts retrieved by the associated shortcut retrieval unit 212.

For example, if the license of the high-compression PDF is invalidated, the setting of the high compression PDF in association with the license of the high-compression PDF is eliminated from the shortcut 302. FIG. 7 is a diagram showing a description of the shortcut which is obtained as a result of eliminating the setting of the high compression PDF. In a shortcut 601, "<high compression PDF> on </high compression PDF>" is eliminated from the shortcut 302 in FIG. 4.

A shortcut-deleting unit 215 is deletes an inexecutable shortcut. Here, "an inexecutable shortcut" is intended to mean a shortcut which is classified as the type made inexecutable due to invalidation of the license out of shortcuts retrieved by the associated shortcut retrieval unit 212. Further, "deleting" includes invalidating a shortcut, such as deleting a shortcut out of shortcuts stored by the shortcut-storing unit 201, and making a shortcut inexecutable. That is, the shortcut-deleting unit 215 functions as means for invalidating a shortcut. It becomes impossible to access the deleted shortcut thereafter.

A valid license-detecting unit 216 (validation detecting unit) detects that a license is validated by the license-validating unit 208. Specifically, the valid license-detecting unit 216 checks and detects the statuses of all licenses stored by the license-storing unit 205. The valid license-detecting unit 216 stores the statuses of all licenses, and determines a difference between the preceding statuses and the current statuses to thereby detect a validated license.

An executable shortcut retrieval unit 217 (second searching unit) retrieves an executable shortcut out of shortcuts backed up by the backup unit 213. For example, in a state where the license of the high compression PDF is invalidated, the shortcut 302 in FIG. 4 is not retrieved. However, in a state where the license of the high compression PDF is validated to make available all of the functions required for execution of the shortcut 302, the shortcut 302 is retrieved.

A restoring unit 218 restores a shortcut retrieved by the executable shortcut retrieval unit 217 to a state stored by the shortcut-storing unit 201. The shortcut retrieved by the executable shortcut retrieval unit 217 has been stored by the backup unit 213, in a manner distinguishable from the shortcuts stored by the shortcut-storing unit 201. The shortcut stored by the backup unit 213 is restored by the restoring unit 218 to the state stored by the shortcut-storing unit 201. Therefore, this makes it possible to display the shortcut by the shortcut-displaying unit 204, and execute the shortcut by the shortcut execution-instructing unit 203.

The shortcut-executing unit 219 receives an instruction for executing a shortcut from the shortcut execution-instructing unit 203, and actually executes the shortcut.

The software units described above are provided in the portal application 220, the license management system 221, and the registered application 222. More specifically, the portal application 220 includes the shortcut-storing unit 201, the shortcut registration unit 202, the shortcut execution-instructing unit 203, the shortcut-displaying unit 204, the associated shortcut retrieval unit 212, and the backup unit 213. The portal application 220 also includes the function-eliminating unit 214, the shortcut-deleting unit 215, the executable shortcut retrieval unit 217, and the restoring unit 218. Further, the license management system 221 includes the license-storing unit 205, the license registration unit 206, the license-deleting unit 207, and the license-validating unit 208. The license management system 221 also includes the time-limited license-monitoring unit 209, the license-invalidating unit 210, the invalid license-detecting unit 211, and the valid license-detecting unit 216. Further, the registered application 222 (222-1, . . . , 222-N) includes the shortcut-executing unit 219 (219-1, . . . , 219-N).

Figure 8:
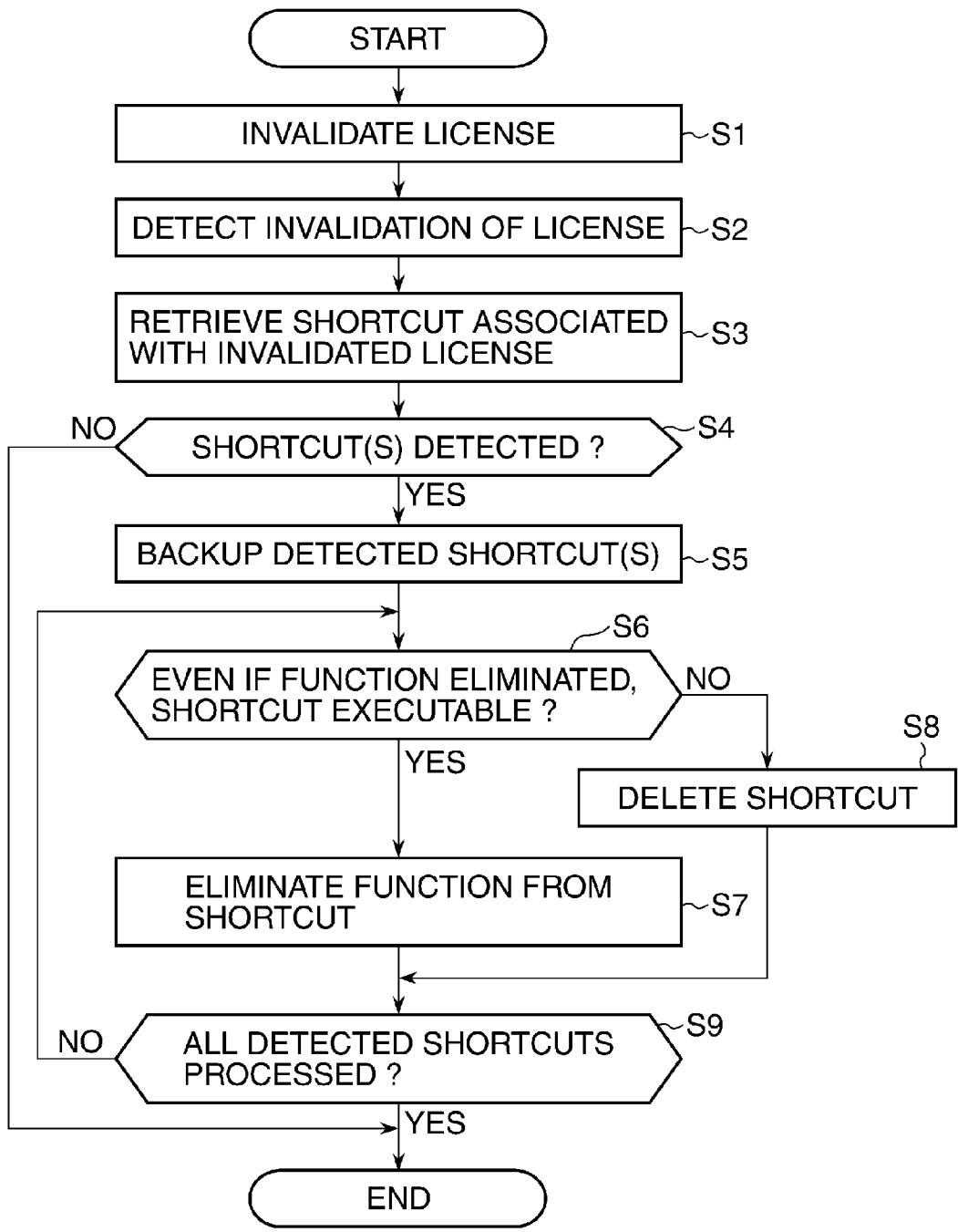
FIG. 8 is a flowchart of a shortcut management process when a license is invalidated.

FIG. 8 is a flowchart of a shortcut management process executed when a license is invalidated. As describe above, this processing program is stored in one of the storage media, i.e. the nonvolatile memory 111, the volatile memory 112, and the auxiliary storage device 113, in the controller section 101, and is executed by the CPU 110 in the controller section 101. In the illustrated example, as a precondition, it is assumed that there is at least one application the license of which is valid, and the license is stored by the license-storing unit 205.

The controller section 101 invalidates the license of a application by the license-invalidating unit 210 (step S1). In invalidating the license, the user gives an instruction for invalidating the license of the application selected by the user through the input device 115 according to contents displayed on the display 114. When the input device 115 receives the instruction for invalidating the license from the user, the input device 115 transmits the accepted instruction to the license-invalidating unit 210. Upon reception of the accepted instruction by the license-invalidating unit 210, the controller section 101 invalidates the license associated with the application stored by the license-storing unit 205. Alternatively, when the valid period of the time-limited license expires, the license-invalidating unit 210 invalidates the time-limited license.

The controller section 101 detects using the invalid license-detecting unit 211 that the license is invalidated (step S2). Thus, the invalidated license is detected.

Using the associated shortcut retrieval unit 212, the controller section 101 retrieves a shortcut which is associated with the application the license of which is invalidated (step S3). Specifically, by referring to a license as illustrated in FIG. 5, the controller section 101 identifies the AppID of the application the license of which is invalidated. Then, a shortcut file 301 illustrated in FIG. 3 is retrieved which contains ActID described in association with the identified AppID. This retrieves the shortcut associated with the invalidated license.

The controller section 101 determines using the backup unit 213, whether or not a shortcut is detected as a result of retrieval in the step S3 (step S4). If no shortcut is detected, the controller section 101 terminates the present process.

On the other hand, if at least one shortcut is detected, the controller section 101 backs up the shortcut retrieved in the step S3 using the backup unit 213 (step S5).

The controller section 101 determines whether or not the shortcut is executable even after the application or partial function thereof associated with the license invalidated in the step S1 is eliminated by the function-eliminating unit 214 from the shortcut detected in the step S3 (step S6). If the shortcut is executable, the controller section 101 causes the function-eliminating unit 214 to eliminate the application or partial function thereof associated with the license invalidated in the step S1, from the shortcut (step S7). The phrase "if the shortcut is executable" is intended to mean the aforementioned case where the shortcut is classified as "the type having come to produce a different result due to invalidation of the license". On the other hand, if the shortcut is inexecutable, the controller section 101 causes the shortcut-deleting unit 215 to delete the shortcut (step S8). The phrase "if the shortcut is inexecutable" is intended to mean the case where the shortcut is classified as "the type made inexecutable due to invalidation of the license".

After executing the steps S7 and S8, the controller section 101 determines whether or not the step S6 and subsequent steps are executed on all of the shortcuts retrieved in the step S3 (step S9). If the step S6 and subsequent steps have been executed on all of the shortcuts, the controller section 101 terminates the present process executed when the license is invalidated. On the other hand, if the step S6 and subsequent steps have not been executed on all of the shortcuts, the controller section 101 returns to the step S6.

Figure 9:
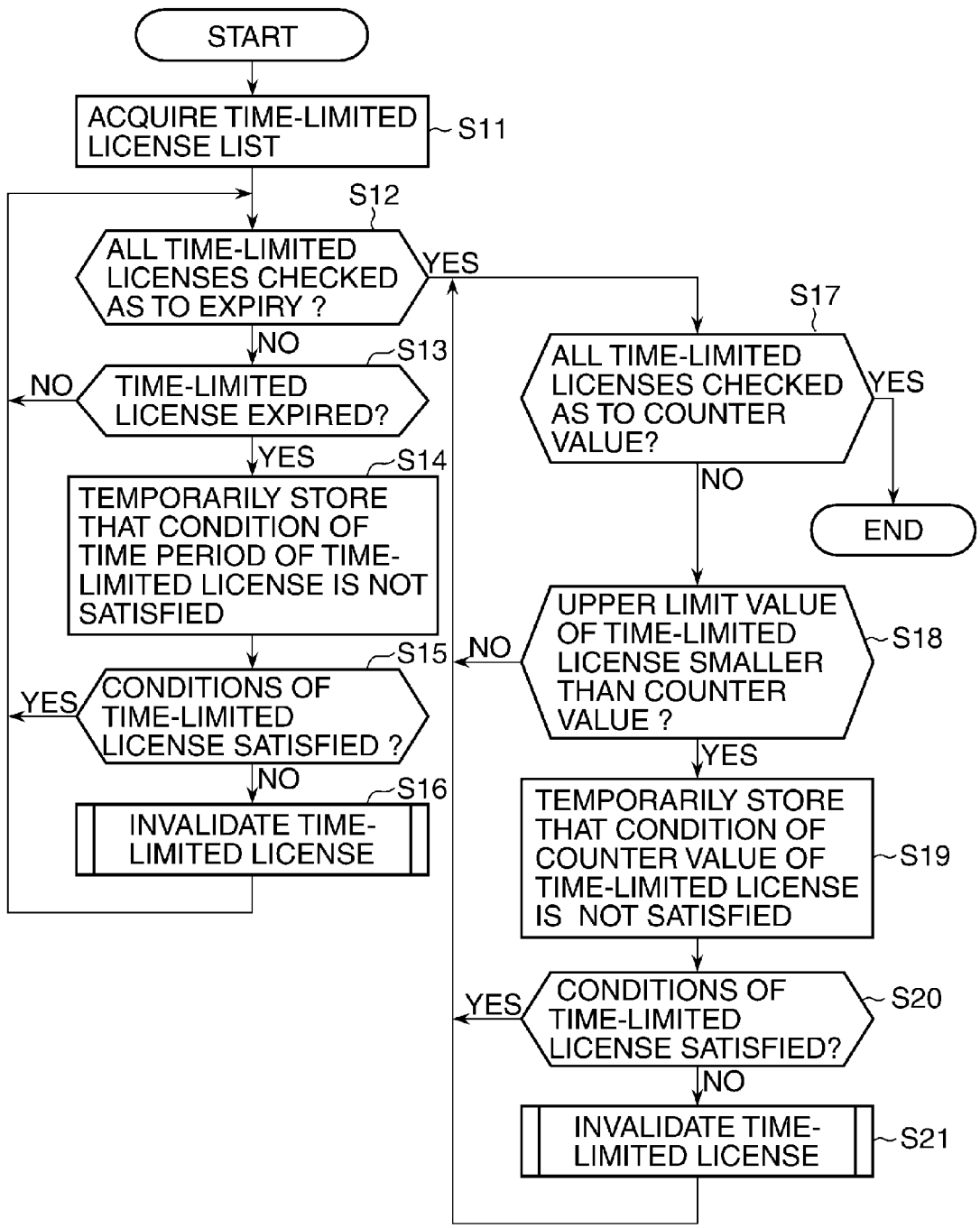
FIG. 9 is a flowchart of a shortcut management process for detecting and invalidating a time-limited license of which a range set thereto is exceeded.

FIG. 9 is a flowchart of a shortcut management process executed when a time-limited license of which the range set thereto is exceeded is detected and invalidated. As described above, this processing is stored in one of the storage media, i.e. the nonvolatile memory 111, the volatile memory 112, and the auxiliary storage device 113, in the controller section 101, and is executed by the CPU 110 in the controller section 101. It should be noted that as described hereinafter, processing after detecting the license of which the range set thereto is exceeded is similar to that in FIG. 8. In the illustrated example, it is assumed as a precondition that at least one validated time-limited licenses exists, and is stored by the license-storing unit 205.

The controller section 101 acquires all information on time-limited licenses stored by the license-storing unit 205, using the time-limited license-monitoring unit 209, and makes a list of them (step S11). Hereinafter, this list is referred to as the time-limited license list.

The controller section 101 determines, using the time-limited license-monitoring unit 209, whether or not checking of all licenses in the time-limited license list acquired in the step S11 as to expiration of a valid time period is completed (step S12). If the checking of all licenses in the time-limited license list acquired in the step S11 is completed, or if the time-limited license list acquired in the step S11 is empty, the controller section 101 proceeds to a step S17.

On the other hand, if the checking of all licenses in the time-limited license list acquired in the step S11 is not completed, the controller section 101 performs the following processing: The controller section 101 checks a time-limited license in the time-limited license list, which remains to be checked, using the time-limited license-monitoring unit 209, to determine whether or not the valid time period of the time-limited license has expired (step S13).

What is checked here is whether or not the current date and time is within the range defined in the time-limited license during which the license is valid. If the current date and time is within the range defined in the time-limited license during which the license is valid, the controller section 101 returns to the step S12.

On the other hand, if the current date and time is not within the range defined in the time-limited license during which the license is valid, the controller section 101 temporarily stores using the time-limited license-monitoring unit 209 that the condition defined in the time-limited license as to the time period during which the license is valid is not satisfied (step S14).

The controller section 101 determines using the time-limited license-monitoring unit 209, whether or not the conditions defined in the time-limited license are satisfied (step S15). In this determination, all of the conditions, including logical operators, defined in the time-limited license are determined. In the case of the example illustrated in FIG. 6, the controller section 101 determines whether or not there are satisfied both of the two conditions, i.e. the condition as to the time period during which the license is valid and the condition as to the number of times of execution of the application or the partial function of the same associated with the license.

As a result of the determination, if the conditions defined in the time-limited license are satisfied, the controller section 101 returns to the step S12. On the other hand, if the conditions defined in the time-limited license are not satisfied, the controller section 101 causes the license-invalidating unit 210 to invalidate the time-limited license (step S16). The process in the step S16 is as described with reference to the flowchart in FIG. 8.

On the other hand, if it is determined in the step S12 that the checking of all licenses in the time-limited license list is completed or if the time-limited license list acquired in the step S11 is empty, the controller section 101 performs the following processing: The controller section 101 determines using the time-limited license-monitoring unit 209, whether or not the checking of all licenses in the time-limited license list acquired in the step S11 as to the number of times of execution of an application or a partial function of the same associated with each license is completed (step S17).

If the checking of all the licenses as to the number of times of execution is completed, the controller section 101 terminates the present process. This includes the following two cases: One is the case where the checking of all licenses in the time-limited license list acquired in the step S11 as to the number of times of execution of an application or a partial function of the same associated with each license is completed. The other is the case where the time-limited license list acquired in the step S11 is empty.

On the other hand, if it is determined in the step S17 that the checking of all licenses in the time-limited license list as to the number of times of execution of an application or a partial function of the same associated with each license is not completed, the controller section 101 performs the following processing: Using the time-limited license-monitoring unit 209, the controller section 101 checks a time-limited license in the time-limited license list which has not been checked yet, and determines based on a result of the checking whether or not an upper limit value of the number of times of execution defined in the time-limited license is smaller than the counter value (step S18). What is checked here is whether or not the counter value of the number of times of execution exceeds the upper limit value of the number of execution of the application or the partial function of the same, associated with the license, which is defined in the time-limited license.

If the counter value of the number of times of execution does not exceed the upper limit value of the number of times of execution of the application or the partial function of the same, associated with the license, which is defined in the time-limited license, the controller section 101 returns to the step S17. On the other hand, if the counter value of the number of times of execution exceeds the upper limit value of the number of times of execution of the application or the partial function of the same, associated with the license, which is defined in the time-limited license, the controller section 101 performs the following processing: The controller section 101 temporarily stores using the time-limited license-monitoring unit 209 that the condition as to the number of times of execution of the application or the partial function of the same, associated with the license, which is defined in the time-limited license, is not satisfied (step S19).

Using the time-limited license monitoring section 209, the controller section 101 determines whether or not the conditions defined in the time-limited license are satisfied (step S20). In this determination, all of the conditions, including the logical operators, defined in the time-limited license are determined. In the case of the example illustrated in FIG. 6, the controller section 101 determines whether or not there are satisfied both of the two conditions, i.e. the condition as to the time period during which the license is valid, and the condition as to the number of times of execution of the application or the partial function of the same associated with the license.

As a result of the determination, if both of the conditions defined in the time-limited license are satisfied, the controller section 101 returns to the step S17. On the other hand, if both of the conditions set to the time-limited license are not satisfied, the controller section 101 causes the license-invalidating unit 210 to invalidate the time-limited license (step S21). The processing in the step S21 is as described hereinabove with reference to the flowchart in FIG. 8. Thereafter, the controller section 101 returns to the step S17.

By executing the flowcharts in FIGS. 8 and 9, it is possible for the image forming apparatus 10 to refuse a instruction for executing the application the license of which is invalidated. Further, a shortcut is deleted by determining whether or not the shortcut is executable even after the partial function of the application is made unavailable due to invalidation of the license. This makes it possible to prevent the executable shortcut from being unnecessarily deleted.

Figure 10:
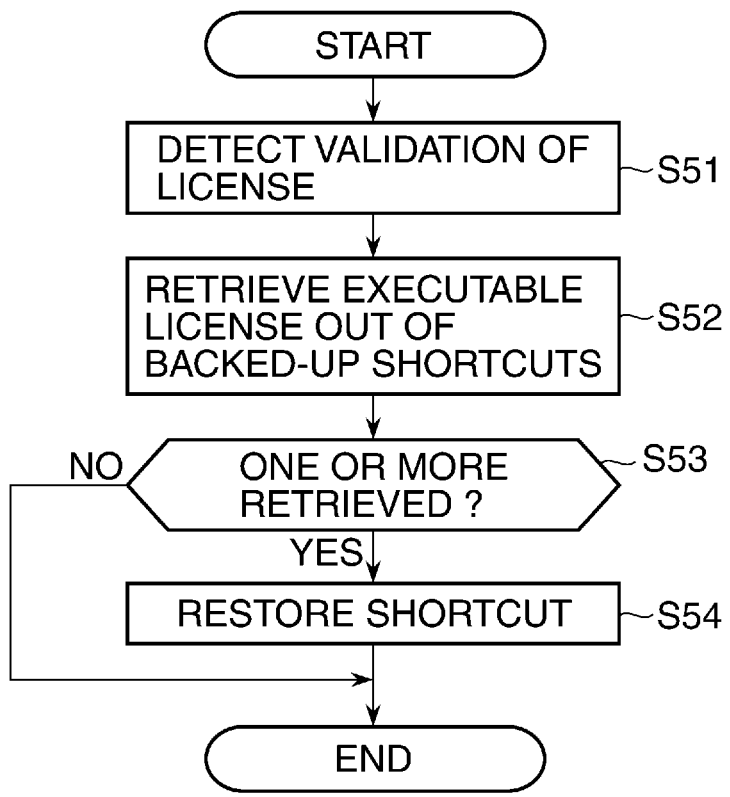
FIG. 10 is a flowchart of a shortcut management process executed when a license is validated.

FIG. 10 is a flowchart of a shortcut management process executed when a license is validated. This processing program is stored in one of the storage media, i.e. the nonvolatile memory 111, the volatile memory 112, and the auxiliary storage device 113, and is executed by the CPU 110. In the illustrated example, it is assumed as a precondition that at least one invalidated time-limited license exists, and is stored by the license-storing unit 205.

The controller section 101 detects using the valid license-detecting unit 216 that a license is validated (step S51). The controller section 101 retrieves an executable shortcut by the executable shortcut retrieval unit 217 out of the shortcuts backed up by the backup unit 213 (step S52).

The controller section 101 determines using the restoring unit 218, whether or not there is at least one shortcut obtained as a result of retrieval in the step S52 (step S53). If there is no shortcut obtained as the result of retrieval, the controller section 101 terminates the present process.

On the other hand, as the result of retrieval in the step S52, if there is at least one shortcut, the controller section 101 causes the restoring unit 218 to restore (reregister) the shortcut obtained as the result of retrieval in the step S52 (step S54). That is, the backed-up shortcut is stored again in the original storage location. After this step, the controller section 101 terminates the process executed when the license is validated.

By executing the flowchart in FIG. 10, the shortcut transferred to the backup area due to invalidation of the license becomes available again when the license is validated.

Figure 11:
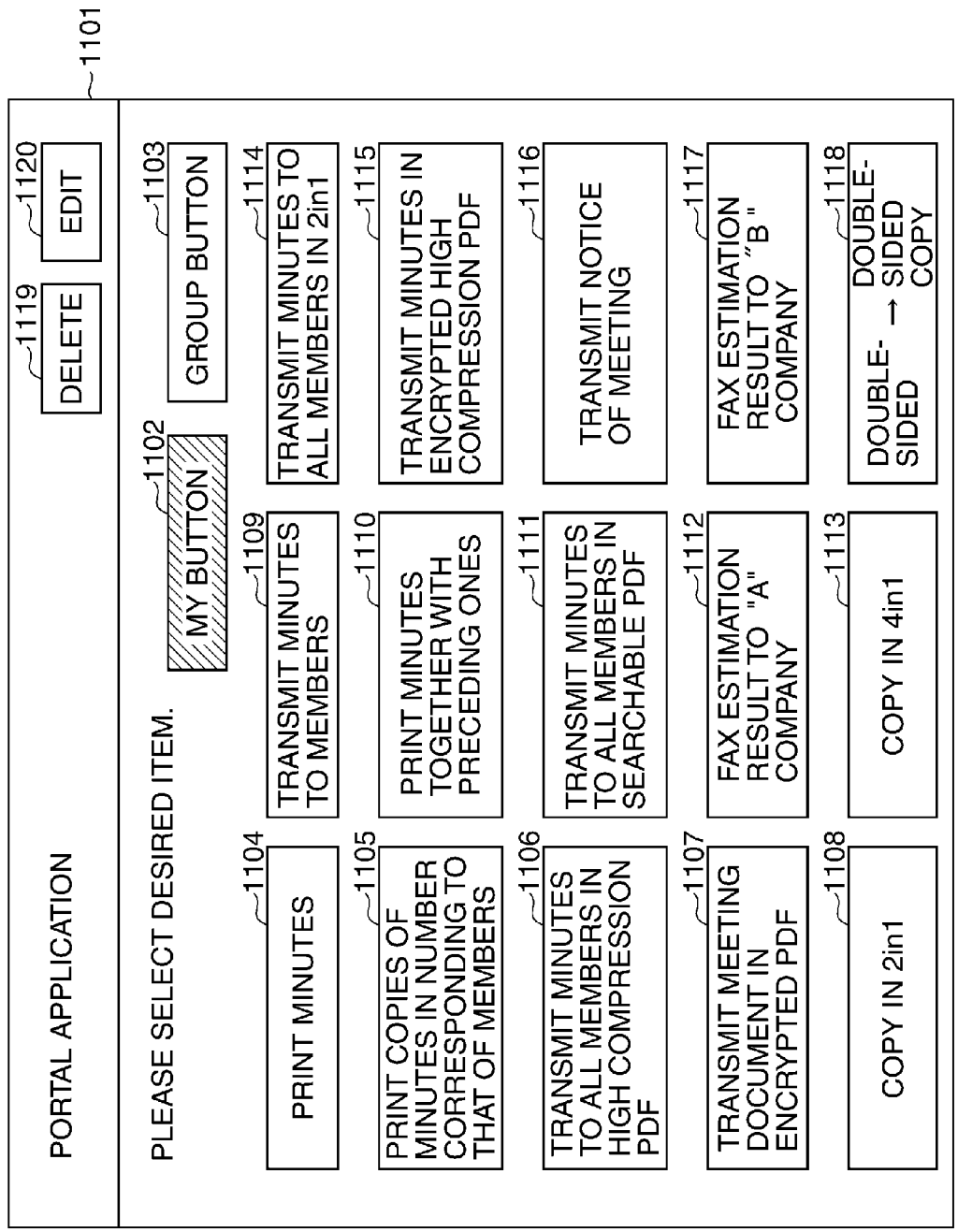
FIG. 11 is a view showing an operation screen of a portal application when all the shortcuts are executable.

Next, a description will be given of an example of an operation screen of the portal application, which is displayed on the display 114 of the operation section 118 with reference to FIGS. 11 to 13. FIG. 11 is a view showing an operation screen of the portal application displayed when all the shortcuts are executable. A screen 1101, which is the whole operation screen of the portal application 220, is displayed on the display 114. Various buttons are set on the screen 1101.

A my button 1102 is used only for displaying a shortcut which is registered by the user who uses the image forming apparatus 10. A group button 1103 is used for displaying a shortcut which is mutually available to all of the users who use the image forming apparatus 10.

Buttons 1104 to 1118 are each used for instructing execution of a shortcut associated with a button. A button 1119 is used for instructing deletion of a selected one of the registered shortcuts. A button 1120 is used for instructing edition of a selected one of the registered shortcuts.

Figure 12:
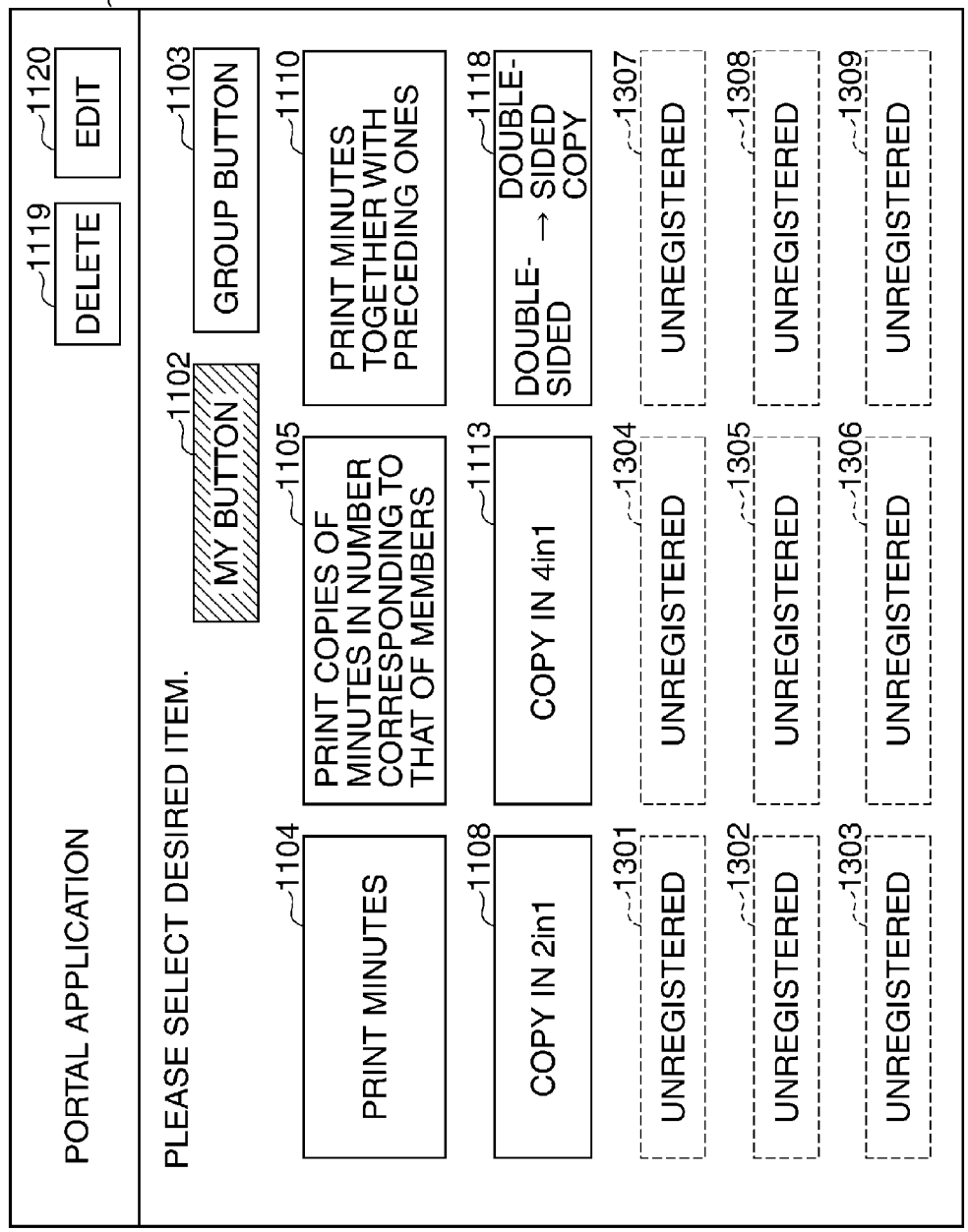
FIG. 12 is a view showing an example of the operation screen of the portal application when the license of a "Send" application as one of basic functions is invalidated.

FIG. 12 is a view showing an example of the operation screen of the portal application when the license of the "Send" application as one of the basic functions is invalidated. By executing the step S8 of the flowchart in FIG. 8, the buttons 1106, 1107, 1109, 1111, 1112, and 1114 to 1117, which become unavailable, are automatically deleted. Then, buttons 1301 to 1309 in an unregistered state are displayed in a grayed-out state. The display area of each of the buttons 1301 to 1309 may be configured not to contain anything.

Figure 13:
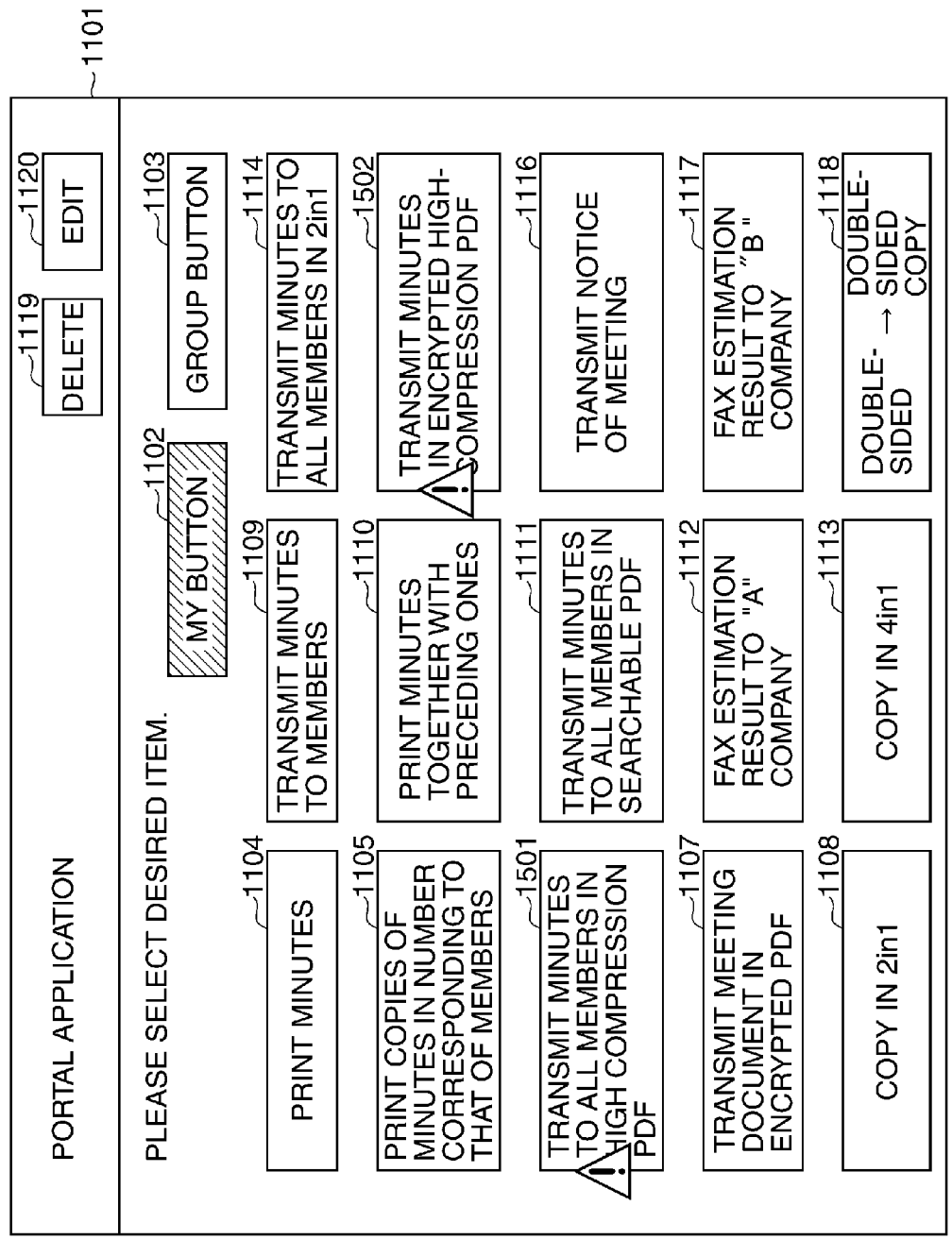
FIG. 13 is a view showing an example of the operation screen of the portal application when the license of a "high-compression PDF" function as one of partial functions equipped in the image forming apparatus 10 is invalidated.

FIG. 13 is a view showing an example of the operation screen of the portal application displayed when the license of the "high-compression PDF" function as one of the partial functions equipped in the image forming apparatus 10 is invalidated. On this screen, buttons 1501 and 1502 are associated with shortcuts resulting from deletion of the function of high compression PDF from the respective shortcuts associated with the buttons 1106 and 1115 in FIG. 11. Further, to indicate this fact, a triangular icon is given to each of the buttons 1501 and 1502. The addition of the triangular icon to each of the buttons makes it possible to notify the user that part of the functions of the shortcut is unavailable. A button to which the triangular icon is given may be configured such that when it is clicked, a screen indicating what partial function is made unavailable is displayed before executing image-processing set by the shortcut associated with the clicked button. This screen makes it possible for the user to recognize what partial function is unavailable. Then, being aware that the partial function is unavailable, the user may instruct to execute or not to execute the shortcut.

As described above, according to the image forming apparatus of the embodiment, it is possible to improve user-friendliness of the portal application. That is, if a license is invalidated to make the associated application or the partial function thereof unavailable, it is possible to immediately and automatically delete a shortcut or shortcuts associated therewith. This makes it possible to improve user-friendliness of the portal application. Further, if the license is validated, it is possible to automatically create the formerly-used shortcut(s). Therefore, it is not necessary to reconfigure the preset values for processing by the registered application which is registered in the shortcut(s), and this also makes it possible to improve user-friendliness of the portal application. Further, if a partial function to be used by a registered application is made unavailable, it is possible to automatically create a shortcut by eliminating the partial function to be used by the registered application. This also makes it possible to improve user-friendliness of the portal application.

Further, if a shortcut is executable even after a partial function to be used by a shortcut is made unavailable, this shortcut is not deleted. This makes it possible to improve user-friendliness of the portal application.

Further, it is possible to easily register and delete a license. Further, it is possible to easily register a shortcut. Further, it is possible to easily invalidate a license. Further, if a valid range set to a license is exceeded, it is possible to immediately invalidate the license. Further, it is possible to easily validate the license.

Further, buttons associated with respective shortcuts are arranged on the screen of the portal application. This makes it possible to improve operability when executing any of the shortcuts.

It should be noted that the units implemented by the respective software modules in the above-described embodiment may be realized by other configurations. Specifically, the license in the above-described embodiment may store information other than the above-described information. For example, the license may hold information of an identifier of a licensed user. In this case, users other than the licensed user of the license cannot use the license. Further, the license may hold information indicative of the status of the license. Inversely, the "LICENSED DEVICE ID" 404 may not be held in the above-mentioned information (see FIG. 5).

Further, the time-limited license in the above-described embodiment employs two ranges within which the license is valid, i.e. the time period during which the license is valid, and the number of times of execution of an application or a partial function of the same, associated with the license. However, the range within which a license is valid may be otherwise specified. For example, information specific to an application or a partial function of the same associated with the license, such as the number of read sides of originals or the number of sides subjected to printing, or the number of jobs, may be specified. Alternatively, a value indicative of a data size may be specified. For example, information indicative of a data size or a packet size, which is processed by the application or the partial function of the same associated with the license, may be specified. Alternatively, the number of simultaneous users who are simultaneously using the application or the partial function may be specified. For example, the number of the simultaneous users may be restricted, like a floating license. However, the number of simultaneous users is changed on a real time basis, and hence the backup unit 213 and the restoring unit 218 may be configured not to manage the shortcut each time the number of simultaneous users is changed. It should be noted that if the configuration of the range within which the license is valid is changed to any described here, it is necessary to change the processing by the time-limited license-monitoring unit 209 according to the change of the configuration. The operation of the time-limited license-monitoring unit 209 will be described hereinafter.

Further, in the above-described embodiment, it is assumed that the range of the time-limited license within which it is valid can be determined by combining a plurality of conditions using logical operators. Although in the illustrated example in FIG. 6, only "&" is mentioned, other generally-used logical operators may be used as well. For example, the range within which the license is valid may be determined by logical addition (or) of the conditions to each other by using "|". Alternatively, the range may be determined by negation of the conditions with using "^".

Further, the shortcut-storing unit 201 stores shortcuts in the auxiliary storage device 113 as files. However, the area and the format for storing the shortcuts may be differently configured. For example, the shortcuts may be stored in a database. Alternatively, the shortcuts may be stored in a storage medium included in the other information processing apparatus on the LAN 130 via the network communication device 116. Alternatively, the shortcuts may be each stored in a CSV file or a binary file, not in an XML file.

Further, information held by a shortcut may not be the same as that held by the shortcut 302. For example, an application may be started without settings for the operation. Further, there may not be a plurality of applications to be operated. Further, one application may be repeatedly operated. Further, the information may contain character strings for description as an attribute of the shortcut.

Further, although in the above-described embodiment, the description is given of the configuration that both of the shortcut files 301 and the shortcuts 302 are stored by the shortcut-storing unit 201, this is not limitative. For example, the shortcut files 301 may be stored by the shortcut-storing unit 201, and the shortcuts 302 may be stored in another storage unit provided in the registered application 222.

Further, in the above-described embodiment, the shortcut registration unit 202 creates a shortcut on the controller section (information processing apparatus) 101 of the image forming apparatus 10, and registers the shortcut by the shortcut-storing unit 201. However, the shortcut may be created in another place. For example, the shortcut may be created on the other information processing apparatus, and input to the information processing apparatus 101 of the image forming apparatus 10 from the outside.

Further, the license registration unit 206 in the above-described embodiment is not an essential component. For example, all the license information may be stored by the license-storing unit 205 in an invalid state in advance. In this case, the license-deleting unit 207 is also not an essential component.

Further, the license-validating unit 208 in the above-described embodiment is not an essential component. For example, the license may be forcibly validated when the license is registered by the license registration unit 206. In this case, it is not necessary for the license to have status information, and if the license is stored by the license-storing unit 205, the application or the partial function thereof associated with the license becomes available. Similarly, the license-invalidating unit 210 is not an essential configuration.

Further, the time-limited license-monitoring unit 209 in the above-described embodiment is required to change processes to be executed by a shortcut according to information on a range set to a time-limited license within which the license is valid. Here, a description will be given of an operation of the time-limited license-monitoring unit 209 which is configured to be compatible with the setting of the time-limited license.

First, a description will be given of monitoring of information specific to the application or partial function of the same associated with the license. The registered application per se manages a specific counter value, and performs counting up or down thereof, as required. Identification information and an upper limit value of the counter value are described in the time-limited license. The time-limited license-monitoring unit 209 refers to the counter based on the identification information of the counter value, and performs monitoring by comparing the counter value with the upper limit value.

Next, a description will be given of monitoring of the amount of data or packets which are processed by the application or the partial function of the same associated with a license. A registered application is newly provided with means for measuring the amount of data or packets, and sets the measured value to a specific counter. Identification Information and the upper limit value of the counter value are described in the time-limited license. The time-limited license-monitoring unit 209 refers to the counter based on the identification information of the counter value, and performs monitoring by comparing the counter value with the upper limit value.

Next, a description will be given of monitoring of the number of simultaneous users who are simultaneously using the application or the partial function of the same associated with the license. As described above, the number of simultaneous users is changed on a real time basis, and hence the backup unit 213 and the restoring unit 218 may be configured not to manage the shortcut each time the number of the simultaneous users is changed. In this case, only for the restricting condition based on the number of simultaneous users, control is performed so as not to cause the time-limited license-monitoring unit 209 to carry out the detection.

Further, the backup unit 213 in the above-described embodiment stores the shortcuts retrieved by the associated shortcut retrieval unit 212 in a manner distinguishable from the shortcuts usually used. Here, although in the description given hereinabove, the phrase "in a manner distinguishable" implies storing in another partition in the auxiliary storage device 113, the retrieved shortcuts may be made distinguishable in a different manner. For example, the retrieved shortcuts may be stored in another directory within one partition.

Alternatively, the retrieved shortcuts may each have a flag indicative of a shortcut backed up within one partition. Alternatively, another storage device may be provided. Alternatively, the retrieved shortcuts may be stored in a storage medium provided in the other information processing apparatus on the LAN 130.

Further, although the function-eliminating unit 214 in the above-described embodiment eliminates an unavailable function from the shortcut, the function-eliminating unit 214 may be configured to further improve the usability. For example, a message describing a function eliminated by the function-eliminating unit 214 may be displayed on the display 114 as an explanation of the shortcut. Alternatively, to indicate that an unavailable function is eliminated by the function-eliminating unit 214, a special mark may be attached to the name of the corresponding shortcut.

Further, the function-eliminating unit 214 in the above-described embodiment is not an essential configuration. In the configuration without the function-eliminating unit 214, all of the shortcuts retrieved by the associated shortcut retrieval unit 212 are deleted by the shortcut-deleting unit 215.

Further, the restoring unit 218 in the above-described embodiment restores a shortcut retrieved by the executable shortcut retrieval unit 217 to the state stored by the shortcut-storing unit 201. At this time, a particular determination may be carried out so as to actually reregister (restore) only a necessary one. For example, in a case where reregistration (restoration) of a shortcut results in a plurality of shortcuts defining the same processes, the shortcut may be detected in advance for elimination from shortcuts to be restored. This makes it possible to prevent a plurality of shortcuts defining the same processes from being created.

Further, if a shortcut remains from which an unavailable function is eliminated by the function-eliminating unit 214, the shortcut may be automatically deleted at the time of restoring the shortcut. In this case, it is required to give each shortcut an identifier for uniquely identifying the shortcut. This makes it possible to prevent a plurality of shortcuts defining the same processes from being created.

Further, when a shortcut remains from which an unavailable function is eliminated by the function-eliminating unit 214, if the shortcut is used more frequently than a predetermined frequency, the shortcut may not be automatically deleted. In this case, a profile section for determining the frequency of use of each shortcut is necessary. This makes it possible to improve operability without deleting the shortcut frequently used.

As described above, not all of the software units in the above-described embodiment are essential. FIG. 14 is a block diagram of the minimum required various software units. Compared with FIG. 2, the license registration unit 206, the license-deleting unit 207, the shortcut registration unit 202 and the like are omitted from the configuration in FIG. 2.

It should be noted that the present invention is not limited to the configuration of the above-described embodiment, but any suitable configuration may be employed insofar as the configuration is capable of realizing the functions as described in claims, or the functions equipped in the configuration of the present embodiment.

For example, although in the above-described embodiment, the case where the present invention is applied to the image forming apparatus is described, this is not limitative, but the present invention can be applied to various electronic apparatus.

Further, the present invention may be applied to a system comprised of a plurality of devices, or an apparatus implemented by one device. Further, it is to be understood that an image forming apparatus may be a facsimile device having a print function, or a multi-function peripheral (MFP) having a print function, a copy function, a scan function, and the like, in addition to a printing device.

Further, it is to be understood that the processes of the present invention can be realized by causing a processing apparatus (CPU, processor) such as a personal computer or the like to execute software (programs) acquired via a network or various storage media.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-035401, filed Feb. 18, 2009, which is hereby incorporated by reference herein in its entirety.

What is claimed is:

1. A shortcut management device comprising:
a storage unit configured to register a shortcut to an application that is governed by a license;
an invalidation detecting unit configured to detect that the license is invalidated;
a determination unit configured to determine whether the shortcut remains executable even though a function of the application is eliminated due to the invalidation of the license detected by the invalidation detecting unit;
a shortcut modification unit configured, in response to the determination unit determining that the shortcut remains executable, to modify the shortcut registered in the storage unit to eliminate the function from the shortcut while maintaining the executability of the shortcut;
a display unit configured, if the shortcut modification unit modifies the shortcut registered in the storage unit, to provide user-notice indicating partial function unavailability of the modified shortcut; and
an instruction-receiving unit configured, when the shortcut displaying unit provides the user-notice, to receive a user-instruction to execute the modified shortcut.

2. The shortcut management device according to claim 1, wherein the determination unit is configured to determine whether the shortcut is made inexecutable due to the invalidation of the license detected by the invalidation detecting unit, and
wherein the shortcut management device further comprises:
an invalidation unit configured, in response to the determination unit determining that the shortcut is made inexecutable, to invalidate the shortcut;
a backup unit configured, in response to the invalidation unit invalidating the shortcut, to store the shortcut in a manner distinguishable from executable shortcuts which are registered in said storage unit;

a validation detecting unit configured to detect that the license is validated;

a retrieval unit configured, in response to the validation detecting unit detecting that the license is validated, to retrieve the shortcut from the backup unit; and a reregistration unit configured to reregister the shortcut which is retrieved by said retrieval unit onto said storage unit.

3. The shortcut management device according to claim 2, wherein if it is detected that the shortcut to be reregistered has already been registered in said storage unit, said reregistration unit is configured to eliminate the shortcut from shortcuts to be reregistered.

4. The shortcut management device according to claim 2, wherein the function is one function out of a plurality of functions of the application that are referenced by the shortcut, and wherein if it is detected that the shortcut, of which the function is eliminated, is to be reregistered by the reregistration unit, but that the shortcut has already been registered in said storage unit, said reregistration unit is configured to eliminate the shortcut from shortcuts to be reregistered.

5. The shortcut management device according to claim 4, wherein even if it is detected that the shortcut, of which the function is eliminated, is to be reregistered by the reregistration unit, but that the shortcut has already been registered in said storage unit, if a frequency of usage thereof is higher than a predetermined frequency, said reregistration unit is configured to not eliminate the shortcut from the shortcuts to be reregistered.

6. The shortcut management device according to claim 1, further comprising:

a license invalidating unit configured to invalidate the license; and a monitoring unit configured to monitor whether or not a valid range set to the license is exceeded, wherein if the valid range of the license is exceeded, said license invalidating unit is configured to invalidate the license.

7. The shortcut management device according to claim 1, wherein the display unit is configured to display buttons on a screen in association with shortcuts registered by said storage unit, respectively; and an execution instructing unit configured to instruct execution of a selected one of the shortcuts associated with the buttons displayed on the screen.

8. A shortcut management method for an electronic apparatus, the method comprising:

causing the electronic apparatus to register a shortcut to an application in a storage unit, the application governed by a license;

causing the electronic apparatus to detect that the license is invalidated;

causing the electronic apparatus to determine whether the shortcut remains executable even though a function of the application is eliminated due to the invalidation of the license;

causing the electronic apparatus, in response to the electronic apparatus determining that the shortcut remains executable, to modify the shortcut registered in the storage unit to eliminate the function from the shortcut while maintaining the executability of the shortcut;

causing the electronic apparatus, if the shortcut registered in the storage unit is modified, to provide user-notice, via a display unit, indicating partial function unavailability of the modified shortcut; and causing the electronic apparatus, when the user-notice is provided, to execute the modified shortcut in response to receiving a user-instruction to execute the modified shortcut.

9. A non-transitory computer-readable storage medium storing a program executable by an electronic apparatus, wherein the program comprises:

instructions configured to cause the electronic apparatus to register a shortcut to an application in a storage unit, the application governed by a license;

instructions configured to cause the electronic apparatus to detect that the license is invalidated;

instructions configured to cause the electronic apparatus to determine whether the shortcut remains executable even though a function of the application is eliminated due to the invalidation of the license;

instructions configured to cause the electronic apparatus, in response to the electronic apparatus determining that the shortcut remains executable, to modify the shortcut registered in the storage unit to eliminate the function from the shortcut while maintaining the executability of the shortcut;

instructions configured to cause the electronic apparatus, if the shortcut registered in the storage unit is modified, to provide user-notice, via a display unit, indicating partial function unavailability of the modified shortcut; and instructions configured to cause the electronic apparatus, when the user-notice is provided, to execute the modified shortcut in response to receiving a user-instruction to execute the modified shortcut.

* * * * *